United States Patent
Fukatsu et al.

[11] Patent Number: 5,907,139
[45] Date of Patent: May 25, 1999

[54] POSITION DETECTOR SWITCH WITH PLANETARY GEARING

[75] Inventors: Yasuhiro Fukatsu, Hamamatsu, Japan; Tatsuya Suzuki, West Bloomfield, Mich.

[73] Assignee: ASMO Co., Ltd., Japan

[21] Appl. No.: 08/804,967

[22] Filed: Feb. 24, 1997

[30] Foreign Application Priority Data

Feb. 27, 1996 [JP] Japan .................................. 8-040011

[51] Int. Cl.⁶ .......................... H01H 19/20; H02P 15/02
[52] U.S. Cl. .......................... 200/19 R; 475/149; 477/11
[58] Field of Search .................. 200/19 R–30 R, 200/11 R, 61.39; 296/223, 266; 318/466; 475/149, 150–158; 477/11

[56] References Cited

U.S. PATENT DOCUMENTS

| | | | |
|---|---|---|---|
| 3,980,846 | 9/1976 | Yoshida | 200/61.39 |
| 4,468,063 | 8/1984 | Yukimoto et al. | 296/223 |
| 4,561,691 | 12/1985 | Kawai et al. | 296/223 X |
| 4,659,141 | 4/1987 | Masuda et al. | 296/223 |
| 4,700,026 | 10/1987 | Kamiyama et al. | 200/19 R |
| 4,920,784 | 5/1990 | Gonsior | 200/56 R |
| 5,068,500 | 11/1991 | Kitada | 200/19 R |
| 5,147,989 | 9/1992 | Ito | 200/19 R X |
| 5,184,050 | 2/1993 | Harada et al. | 318/467 |
| 5,422,449 | 6/1995 | Kano et al. | 200/19 R |
| 5,612,600 | 3/1997 | Bratkowski et al. | 318/266 |
| 5,669,843 | 9/1997 | Bolton et al. | 475/149 |
| 5,762,579 | 6/1998 | Torii et al. | 477/11 |
| 5,773,947 | 6/1998 | Torii et al. | 318/466 |

FOREIGN PATENT DOCUMENTS 8-29114  2/1996  Japan .

*Primary Examiner*—J. R. Scott
*Attorney, Agent, or Firm*—Parkhurst & Wendel

[57] ABSTRACT

A device for detecting a position of a moving body is provided in which a position of a moving body such as a window glass can be detected with high accuracy, initial positions can be set without complicated adjustment, such can be realized with a simple structure and at a low cost, and assemblability can be greatly improved. In the device for detecting a position of a moving body, spring claws, which form a clutch mechanism and press a carrier, are formed integrally with a protective plate. A switch portion including a moving contact is provided integrally with a ring gear of the planetary gear group and rotates therewith. The switch portion detects the position of the moving body by on-and-off operation thereof. The spring claws are provided at a side of a planetary gear group (a planetary gear and the carrier) opposite a side at which a cover plate is provided. Accordingly, the protective plate can be installed after the planetary gear group. In a state in which the planetary gear and the carrier are provisionally installed, press-contact force of the spring claws is not applied to the carrier. As a result, the planetary gear and the carrier do not rise and positional deviation does not occur, and therefore, the assemblability can be greatly improved.

23 Claims, 16 Drawing Sheets

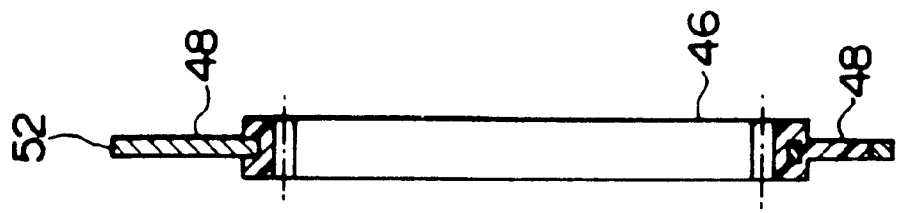
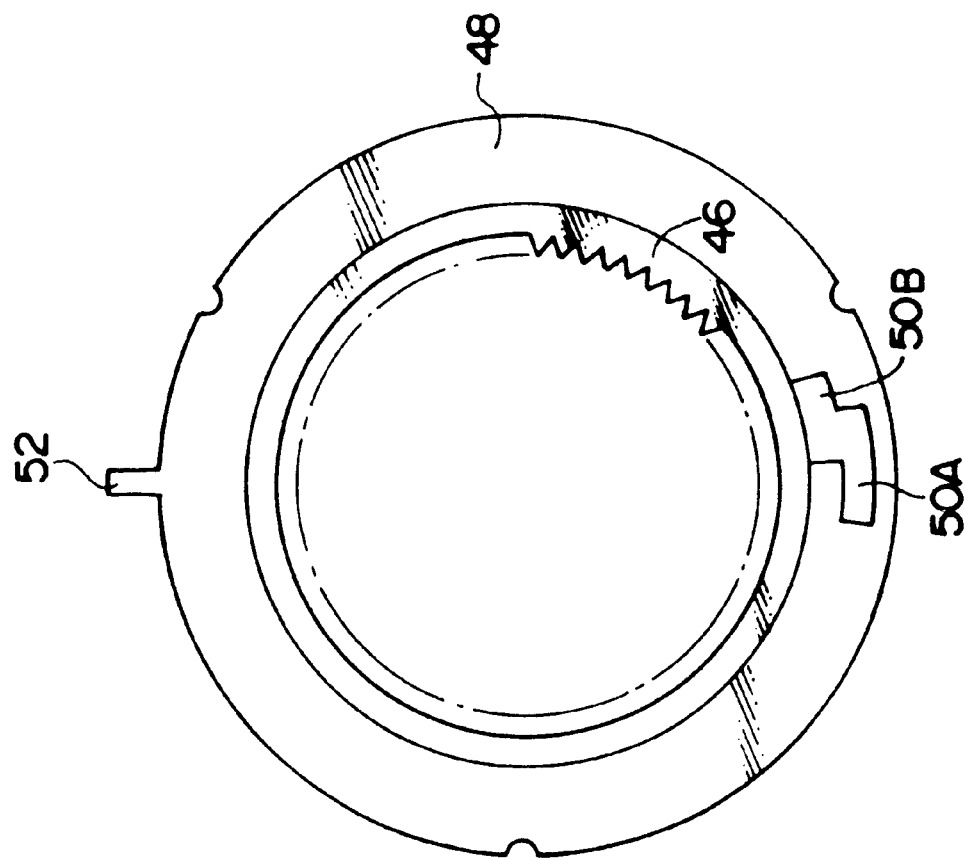

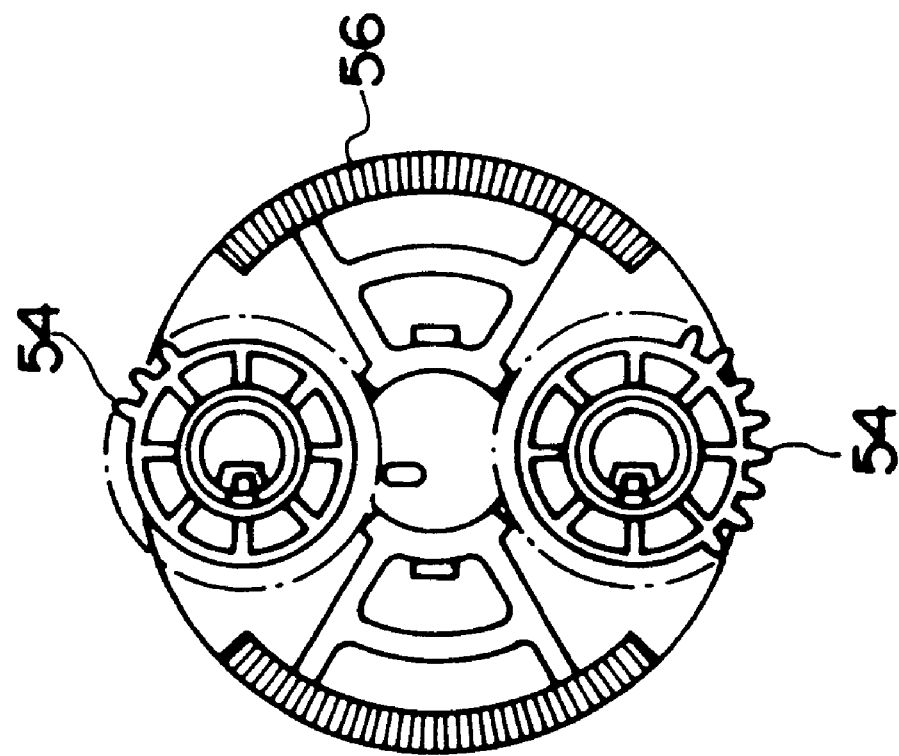

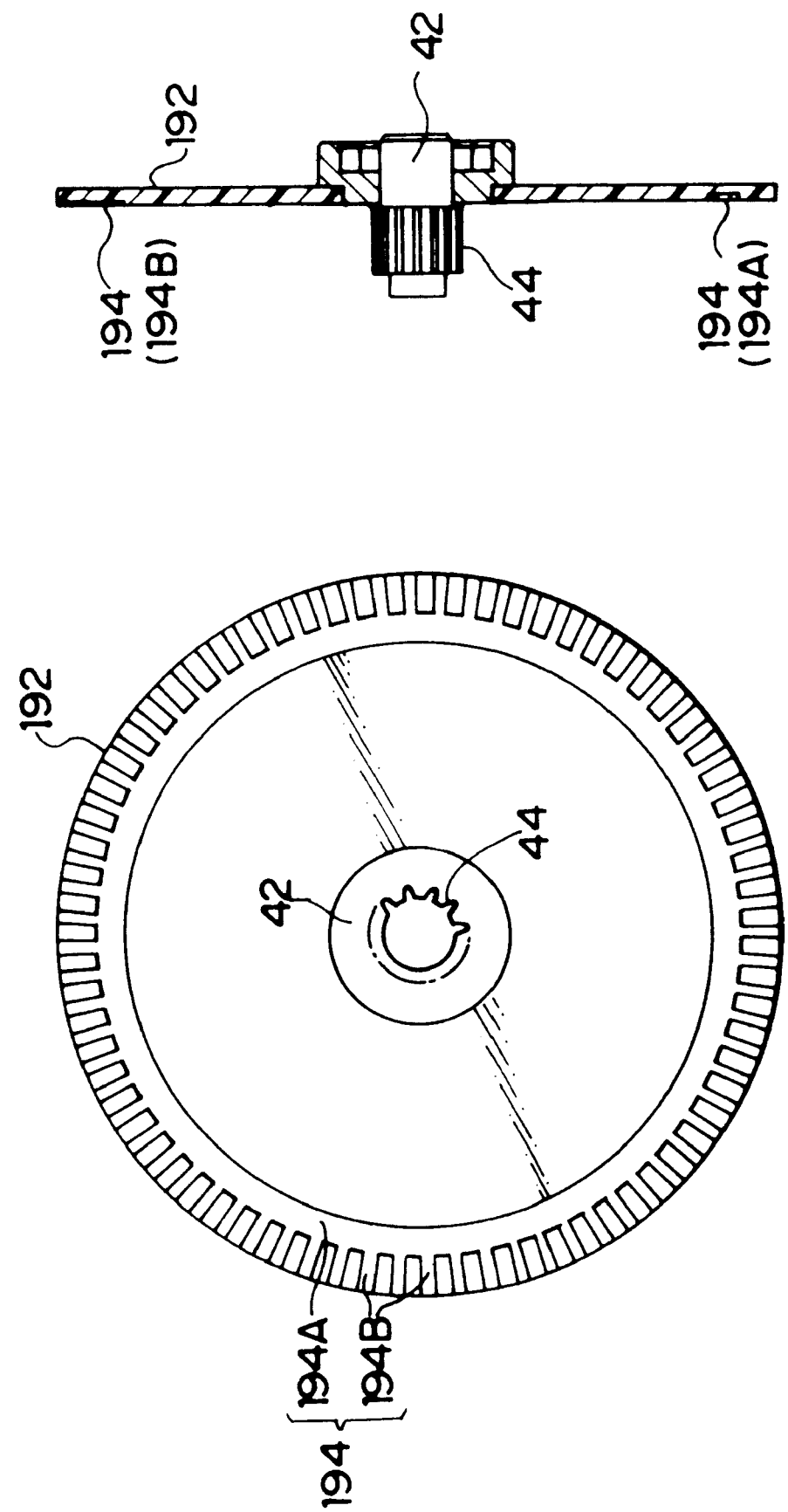

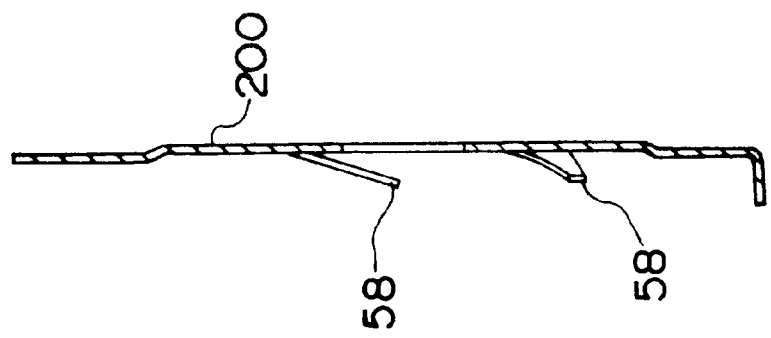
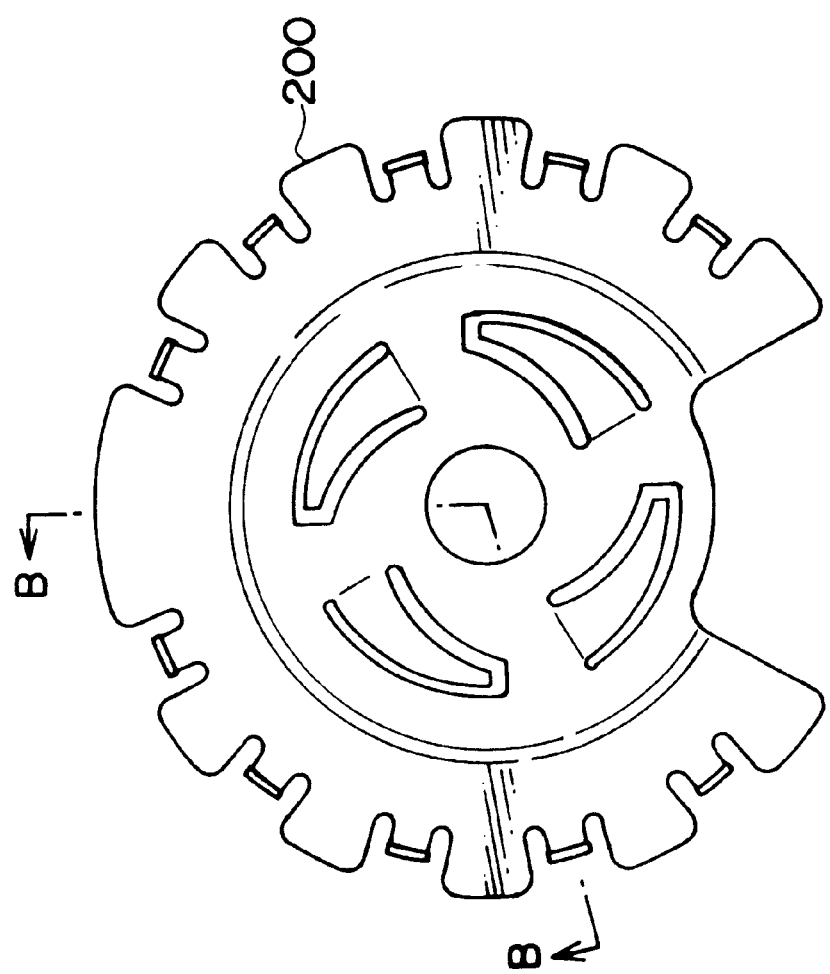

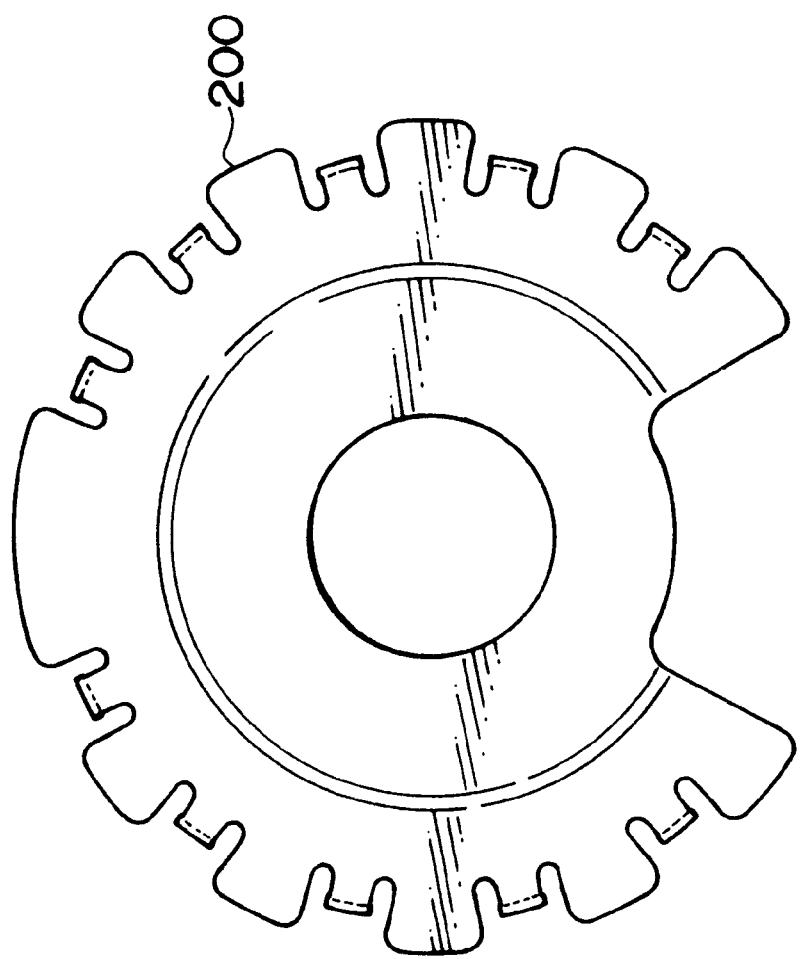

POSITION DETECTOR SWITCH WITH PLANETARY GEARING

BACKGROUND OF THE INVENTION

1. Field of the Invention

The present invention relates to a device for detecting a position of a moving body which device is used in a power window device, which moves a window glass of a vehicle door to open and close the window glass, or is used in a sunroof device, which moves a sunroof to open and close the sunroof, or the like.

2. Description of the Related Art

A motor is used as the drive source in a power window device, which moves a window glass of a vehicle down and up to open and close the window glass, or in a sunroof device, which moves a sunroof to open and close the sunroof.

There are power window devices which have a so-called catch-preventing function which prevents a portion of the body of a vehicle occupant or a foreign object from being inadvertently caught between the window glass and the window frame of the vehicle door. The following two types of structures are examples of power window devices equipped with such a catch-preventing function. (1) A limit switch is disposed at a predetermined position of the door. On the basis of signals from the limit switch and the lock current of the motor, a determination is made as to whether a foreign object has been caught by the window glass, and the movement of the window glass, i.e., the rotational position of the motor, is controlled appropriately. (2) The rotational frequency of the armature is detected by providing a Hall IC or a special commutator. On the basis of the rotational frequency detection signal (the number of pulses or the pulse width of the pulse signal), a determination is made as to whether a foreign object has been caught, and the rotational position of the motor is controlled appropriately.

However, in such power window devices (motor rotational position detecting mechanisms), a drawback arises in that complicated adjustment of the installation positions while the motor and the window regulator and the like are being installed or complex resetting after installation is needed. Further, in cases in which a catch-preventing mechanism is used, there is a drawback in that parts such as a control device or the like are expensive and are imprecise.

The inventors of the invention disclosed in the present application have proposed devices for detecting a position of a moving body in order to overcome the aforementioned drawbacks (e.g., Japanese Patent Application Laid-Open (JP-A) No. 8-29114).

This device for detecting a position of a moving body includes a planetary gear group, a switch portion and a clutch mechanism. The planetary gear group is formed by a ring gear rotatably held at the cover plate of the device and a planetary gear meshing with the ring gear. The switch portion is formed by a moving contact, which is provided integrally with the ring gear of the planetary gear group and rotates with the ring gear, and fixed contacts, which are fixed to the cover plate and are able to contact the moving contact. The clutch mechanism has a wave washer which presses a carrier of the planetary gear due to urging force, and the clutch mechanism cuts off transmission of forward direction rotational force from the moving body (the motor output shaft) to the ring gear. In this way, when the position detecting device is used in a power window device or a sunroof device, the position of the window glass or the sunroof can be detected with high accuracy and the movement thereof can be controlled. Moreover, the initial positions can be set without complicated adjustment, and these features can be realized with a simple structure and at a low cost.

In the above-described device for detecting a position of a moving body, the parts such as the clutch mechanism (the wave washer), the ring gear, the planetary gear, and the like are sequentially installed coaxially with a predetermined axis corresponding to the moving body (the motor output shaft), with the cover plate of the device used as a reference. When assembly is completed, the carrier which supports the planetary gear is in a state of press-contacting a protective plate (immobile plate) which is fixed to the cover plate. In this way, a predetermined frictional force is applied, and rotation of the carrier (i.e., revolution of the planetary gear) is prevented, such that the moving force of the moving body is transmitted from the planetary gear to the ring gear and the ring gear is rotated.

However, the clutch force (pressing/urging force) of the clutch mechanism (the wave washer) is applied to the carrier also at the time when the planetary gear and the carrier are being provisionally installed. Therefore, when the clutch mechanism (the wave washer), the planetary gear, and the carrier are being provisionally installed with respect to the cover plate, due to the pressing/urging force of the clutch mechanism (the wave washer), the carrier and the planetary gear rise upward and the axis is shifted, which may impede precise positioning during provisional assembly and lead to a deterioration of the assemblability. Accordingly, in order to accurately install the planetary gear and the carrier coaxially with the predetermined axis with the cover plate as a reference, assembly must be carried out cautiously, and there is therefore room for improvement with respect to this point.

SUMMARY OF THE INVENTION

In view of the aforementioned, an object of the present invention is to provide a device for detecting a position of a moving body in which the position of a moving body such as a window glass or a sunroof can be detected with high accuracy, initial positions can be set without complicated adjustment, these features can be realized with a simple structure and at a low cost, and further, the assemblability is greatly improved.

In accordance with a first aspect of the present invention, there is provided a device for detecting a position of a moving body for detecting a predetermined position of a moving body, comprising: a planetary gear group having a ring gear which is held rotatably at a cover plate of the device and a planetary gear which is rotatably supported by a carrier and meshes with the ring gear, the planetary gear group being operated interlockingly with the moving body due to moving force transmitted from the moving body which moves in forward and reverse directions; a switch portion having a moving contact provided integrally with the ring gear of the planetary gear group and rotating together with the ring gear, and having a fixed contact fixed to the cover plate and able to contact the moving contact, the switch portion able to detect the predetermined position of the moving body due to on-and-off operation of the switch portion; and a clutch mechanism pressing the carrier of the planetary gear group, the clutch mechanism normally preventing revolution of the planetary gear to transmit the moving force of the moving body from the planetary gear to the ring gear so as to rotate the ring gear, and in a state in which the switch portion is operated, cutting off transmission of forward direction rotating force from the moving body to the ring gear by permitting revolution of the planetary gear, wherein an urging means of the clutch mechanism, which urging means presses the carrier, is disposed at a side of the planetary gear group which side is opposite the side at which the cover plate is provided.

In the device for detecting a position of a moving body of the first aspect of the present invention, usually, revolution of the planetary gear of the planetary gear group is prevented by the clutch mechanism. When the moving body rotates in forward and reverse directions, the moving force is transmitted to the planetary gear and the ring gear, and the ring gear is rotated interlockingly with the moving body. When the moving body reaches a predetermined position, the moving contact which rotates together with the ring gear separates from the fixed contact so as to operate the switch portion. The predetermined position of the moving body is thereby detected.

When the switch portion is in an operating state (e.g., when the moving contact contacts the fixed contact), revolution of the planetary gear is permitted by the clutch mechanism, and transmission of the forward direction rotational force from the moving body to the ring gear is cut off. More specifically, even if the moving body rotates in the forward direction after the switch portion is operated, the ring gear does not move, and the switch portion remains in the operating state (e.g., the state in which the moving contact contacts the fixed contact). Namely, due to the moving body being rotated sufficiently in the forward direction, the initial state in which the switch portion is operated (e.g., an initial state in which the moving contact contacts the fixed contact) is set automatically.

Accordingly, for example, in a case in which the position detecting device is used in a vehicle power window device having a catch-preventing function or in a drive motor of such a vehicle power window device, at the time of assembly to the vehicle body, by rotating the output shaft of the motor sufficiently in the forward direction, the initial state in which the switch portion is operated (e.g., an initial state in which the moving contact contacts the fixed contact) is set automatically. Initial positions can be set easily without complicated adjustment of the installation positions at the time of assembly or complicated resetting after assembly. Further, in a structure in which the rotational frequency of the armature of the motor for driving a power window device is detected by using a Hall IC or the like and the position of the motor rotational shaft, i.e., the position of the window glass, is detected, a counter is indispensable to the control circuit. However, in the position detecting device of the present invention, the accurate position can be discriminated by a single ON/OFF signal. There is no need for a counter in a control circuit, and the position detecting device is less expensive.

Further, in the device for detecting a position of a moving body of the first aspect of the present invention, the urging means of the clutch mechanism for pressing the carrier is disposed at the side of the planetary gear group which side is opposite the side at which the cover plate is disposed. More specifically, when the planetary gear group (the planetary gear and the carrier) is provisionally installed by using the cover plate as a reference, the urging means of the clutch mechanism can be installed after the planetary gear group (the planetary gear and the carrier). Therefore, in the state in which the planetary gear group (the planetary gear and the carrier) is provisionally installed, the clutch force (pressing/urging force) of the clutch mechanism is not applied to the planetary gear group (carrier). Accordingly, in its provisionally installed state, the planetary gear group (the planetary gear and the carrier) does not rise from the cover plate, and the axis does not shift. Further, in the state in which the planetary gear group (the planetary gear and the carrier) and the clutch mechanism are provisionally installed, the clutch force (pressing/urging force) of the clutch mechanism acts on the carrier, but the clutch force (pressing/urging force) of the clutch mechanism is applied to the carrier in a direction of pressing the carrier toward the cover plate. Accordingly, in this state as well, the planetary gear group (the planetary gear and the carrier) is reliably held by the clutch force (pressing/urging force) of the clutch mechanism and does not rise from the cover plate, and the axis does not shift. In this way, accurate positioning at the time of installing the planetary gear group (the planetary gear and the carrier) is not prevented, and assemblability is greatly improved.

In a device for detecting a position of a moving body of the second aspect of the present invention, the device for detecting a position of a moving body of the first aspect further comprises a protective plate provided at a side of the planetary gear group which side is opposite the side at which the cover plate is provided, the urging means being disposed between the carrier and the protective plate.

In the device for detecting a position of a moving body of the second aspect, the planetary gear group is held by the protective plate and the urging means is disposed between the protective plate and the carrier. In this case as well, when the planetary gear group is provisionally installed by using the cover plate as a reference, the urging means of the clutch mechanism can be installed after the planetary gear group. In a state in which the planetary gear group is provisionally installed, the clutch force (pressing/urging force) of the clutch mechanism is not applied to the planetary gear group (carrier). Accordingly, in its provisionally installed state, the planetary gear group does not rise from the cover plate, and the axis does not shift. Further, when the planetary gear group and the clutch mechanism are in a provisionally installed state, the planetary gear group is reliably held by the clutch force (pressing/urging force) of the clutch mechanism and does not rise from the cover plate, and the axis does not shift. In this way, accurate positioning at the time of installing the planetary gear group is not prevented, and assemblability is greatly improved.

In a device for detecting a position of a moving body of a third aspect of the present invention, in the device for detecting a position of a moving body of the second aspect, the urging means is formed integrally with the protective plate.

Accordingly, in the device for detecting a position of a moving body of the third aspect, the number of parts is reduced. Further, the urging means can be installed together with and integrally with the protective plate, and therefore, the number of assembly processes can also be reduced.

In a device for detecting a position of a moving body of a fourth aspect of the present invention, in the device for detecting a position of a moving body of the second or the third aspect, the protective plate is a metal plate having elasticity, and the urging means is formed by spring claws which are formed by cutting portions of the metal protective plate and bending the cut portions toward the cover plate.

Accordingly, in the device for detecting a position of a moving body of the fourth aspect, the number of parts is reduced, and the number of assembly processes can be reduced as well.

In a device for detecting a position of a moving body of a fifth aspect of the present invention, in the device for detecting a position of a moving body of the second aspect, the urging means is provided integrally with the carrier.

Therefore, in the device for detecting a position of a moving body of the fifth aspect, the number of parts can be reduced. Further, because the urging means can be installed together with and integrally with the carrier, the number of assembly processes can also be reduced.

In a device for detecting a position of a moving body of a sixth aspect of the present invention, the device for detecting a position of a moving body of any of the first through the fifth aspects further comprises: pulse generating means provided within the cover plate such that a protective plate is interposed between the pulse generating means and the planetary gear group, the pulse generating means being interlocked with the moving body to generate pulses; and pulse detecting means for detecting the pulses generated by the pulse generating means.

In the device for detecting a position of a moving body of the sixth aspect, the pulses generated by the pulse generating means, which is interlocked with the moving body, are detected by the pulse detecting means. As a result, the position of the moving body can be detected linearly on the basis of the detected pulse signal. Accordingly, for example, if the device for detecting a position of a moving body is used in a vehicle power window device equipped with a catch-preventing function, the position of the window glass can be detected at all times.

In this case, the pulse generating means, which linearly detects the position of the moving body, is provided within the cover plate with the protective plate disposed between the cover plate and the pulse generating means. Therefore, the entire device can be made more compact.

The above and other objects, features and advantages of the present invention will become apparent from the following description and claims taken in conjunction with the accompanying drawings in which preferred embodiments of the present invention are shown by way of illustrative example.

BRIEF DESCRIPTION OF THE DRAWINGS

The invention will now be described with reference to the accompany drawings wherein:

FIG. 8A is a plan view of the ring gear of the position detecting device relating to the embodiment of the present invention;

FIG. 8B is a sectional view of the ring gear of the position detecting device relating to the embodiment of the present invention;

FIG. 9A is a plan view of planetary gears and a carrier of the position detecting device relating to the embodiment of the present invention;

FIG. 9B is a sectional view of the planetary gears and the carrier of the position detecting device relating to the embodiment of the present invention;

FIG. 11A is a plan view illustrating a pulse plate and a connecting shaft of the position detecting device relating to the embodiment of the present invention;

FIG. 11B is a sectional view illustrating the pulse plate and the connecting shaft of the position detecting device relating to the embodiment of the present invention;

FIG. 12A is a plan view illustrating a protective plate of the position detecting device relating to the embodiment of the present invention;

FIG. 12B is a sectional view illustrating the protective plate of the position detecting device relating to the embodiment of the present invention;

FIGS. 16A and 16B are views, corresponding to FIGS. 12A and 12B, illustrating a protective plate relating to the other embodiment of the present invention.

DESCRIPTION OF THE PREFERRED EMBODIMENTS

Figure 2:
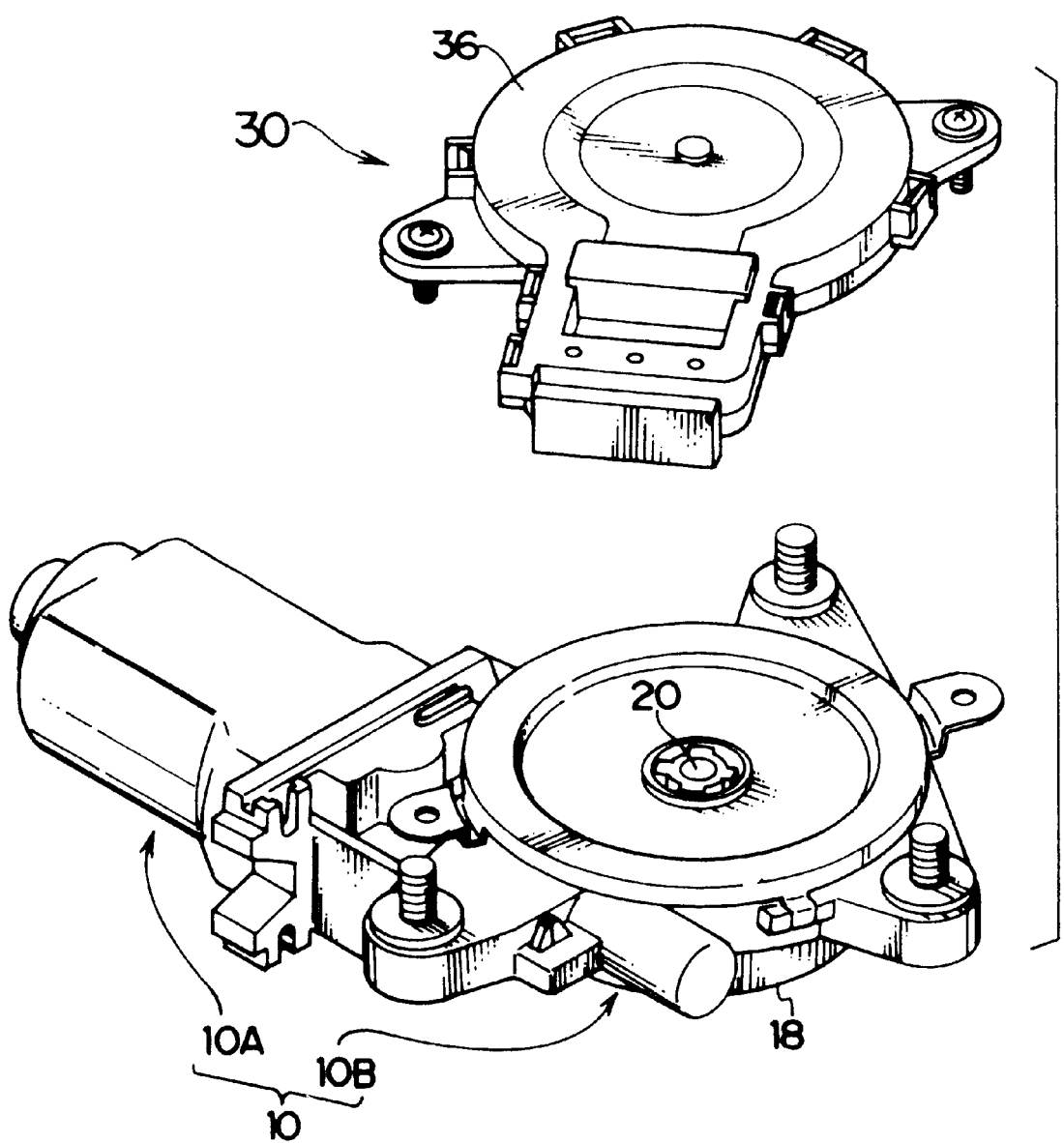
FIG. 2 is an overall perspective view of a motor for a power window device to which the position detecting device relating to the embodiment of the present invention is applied.
Figure 3:
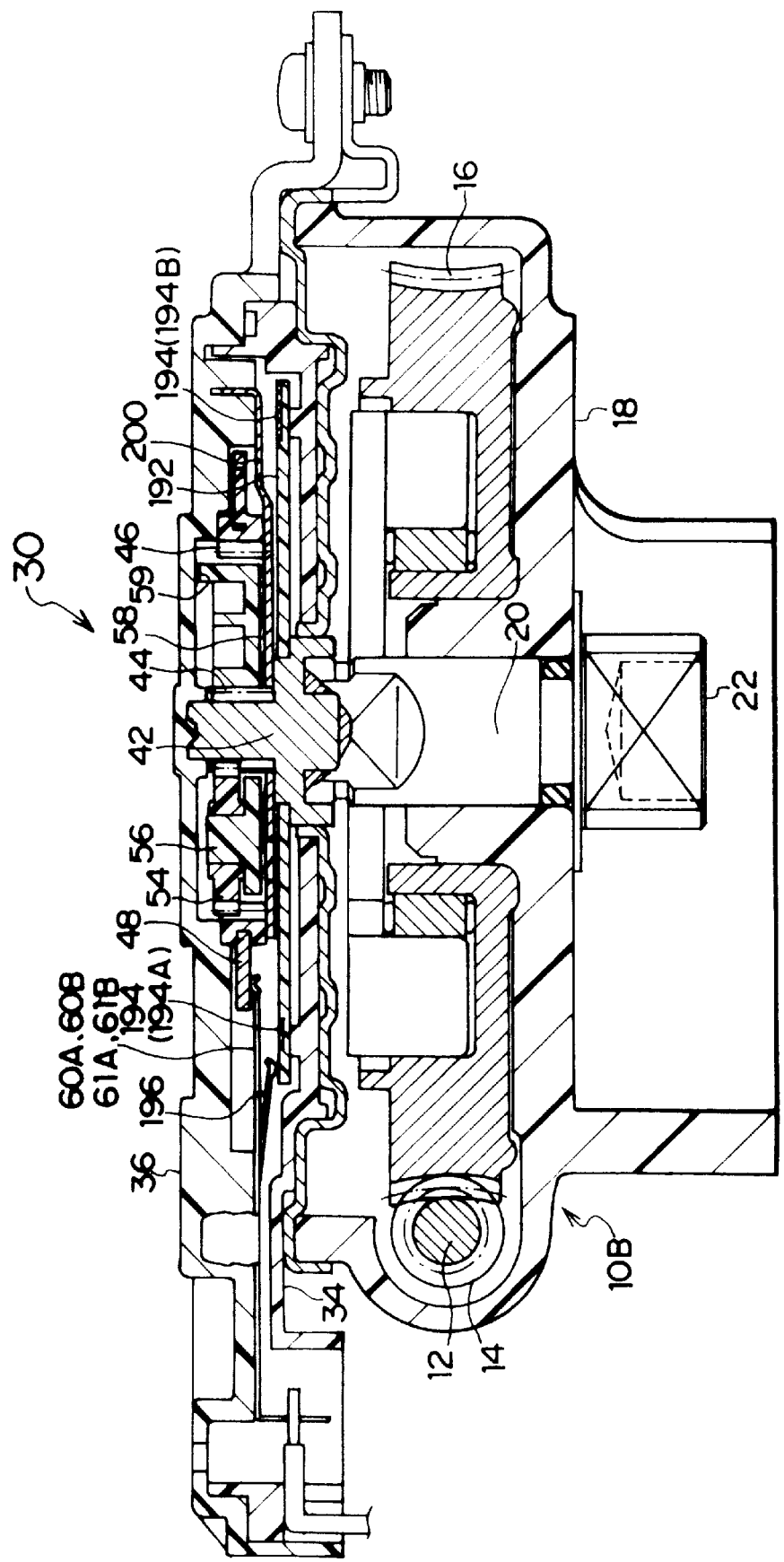
FIG. 3 is a sectional view of the position detecting device relating to the embodiment of the present invention and of the motor for the power window device to which the position detecting device is applied.

FIG. 2 is an overall perspective view of a position detecting device 30 relating to the embodiment of the present invention and of a motor 10 for a power window device to which the position detecting device 30 is applied. FIG. 3 is a cross-sectional view of the position detecting device 30 and the motor 10.

The motor 10 is formed by a motor portion 10A and a gear portion 10B connected to the motor portion 10A. A rotating shaft 12 of the motor portion 10A extends to the interior of the gear portion 10B, and a worm gear 14 is formed at the distal end of the rotating shaft 12. The worm gear 14 meshes with a rotating gear wheel 16 disposed within the gear portion 10B.

At the rotating gear wheel 16, a shaft 20 serving as a motor output shaft is rotatably supported at a cover 18 of the gear portion 10B. When the motor portion 10A is operated and the rotating shaft 12 rotates, the rotational force is transmitted to the rotating gear wheel 16 via the worm gear 14, and the shaft 20 is rotated. An output fitting portion 22 is provided at the distal end of the shaft 20 and is connected to the drive portion of a window regulator (not shown). In the present embodiment, for example, a window glass moves one stroke due to the shaft 20 (the output fitting portion 22) rotating 3 to 4.5 times.

The position detecting device 30 is attached to the surface of the gear portion 10B at the side opposite the output fitting portion 22.

Figure 1:
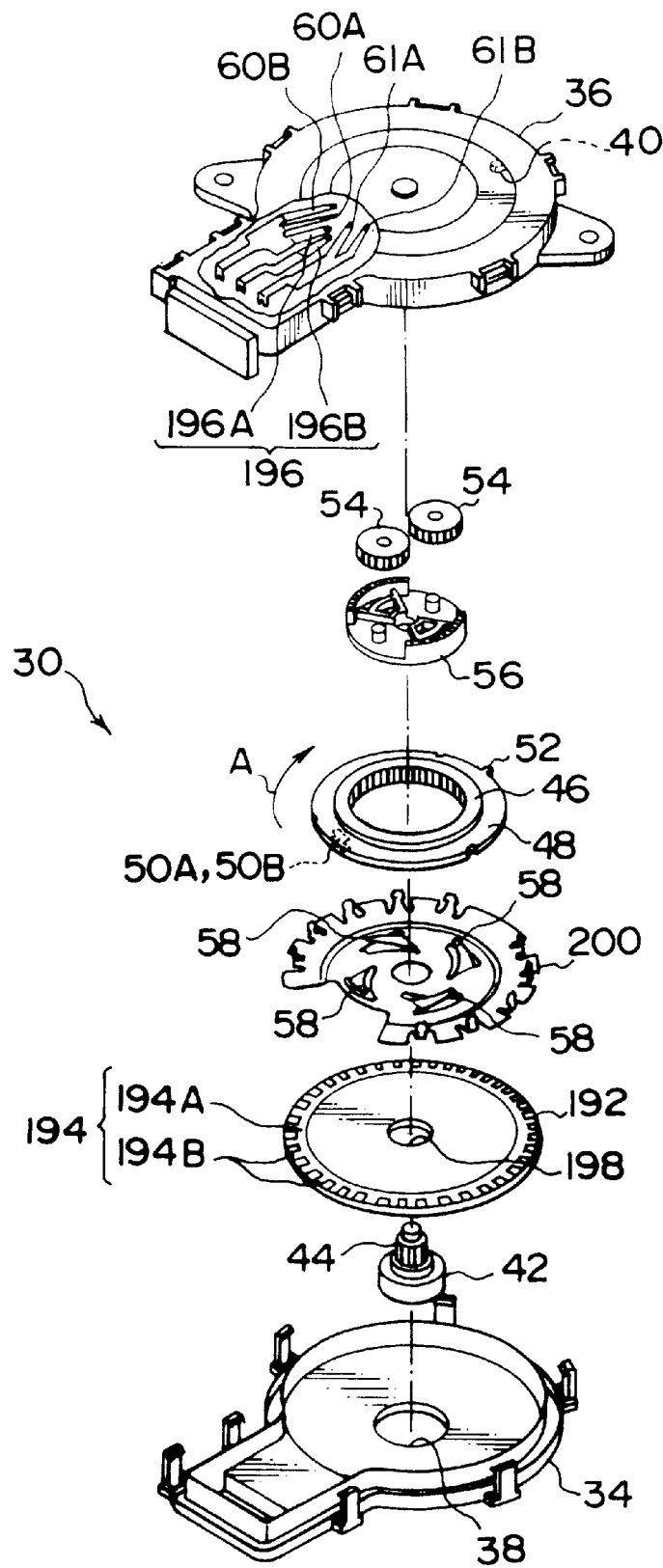
FIG. 1 is an exploded perspective view of a position detecting device relating to an embodiment of the present invention.

As illustrated in detail in FIG. 1, the position detecting device 30 includes a base plate 34 and a cover plate 36, and is formed thin and substantially cylindrical. A through hole 38 is formed in the central portion of the base plate 34. A projection 40 is formed at the inner peripheral surface of the cover plate 36 in the axial direction.

The position detecting device 30 has a connecting shaft 42. One end of the connecting shaft 42 is connected integrally to the shaft 20 of the rotating gear wheel 16 and always rotates integrally with the shaft 20. The other end of the connecting shaft 42 projects into the interior of the position detecting device 30 (into the interior of the base plate 34 and the cover plate 36) via the through hole 38 formed in the base plate 34. A sun gear 44 forming a portion of a planetary gear group is provided in a vicinity of this other end of the connecting shaft 42, and meshes with planetary gears 54 which will be described later.

Figure 5:
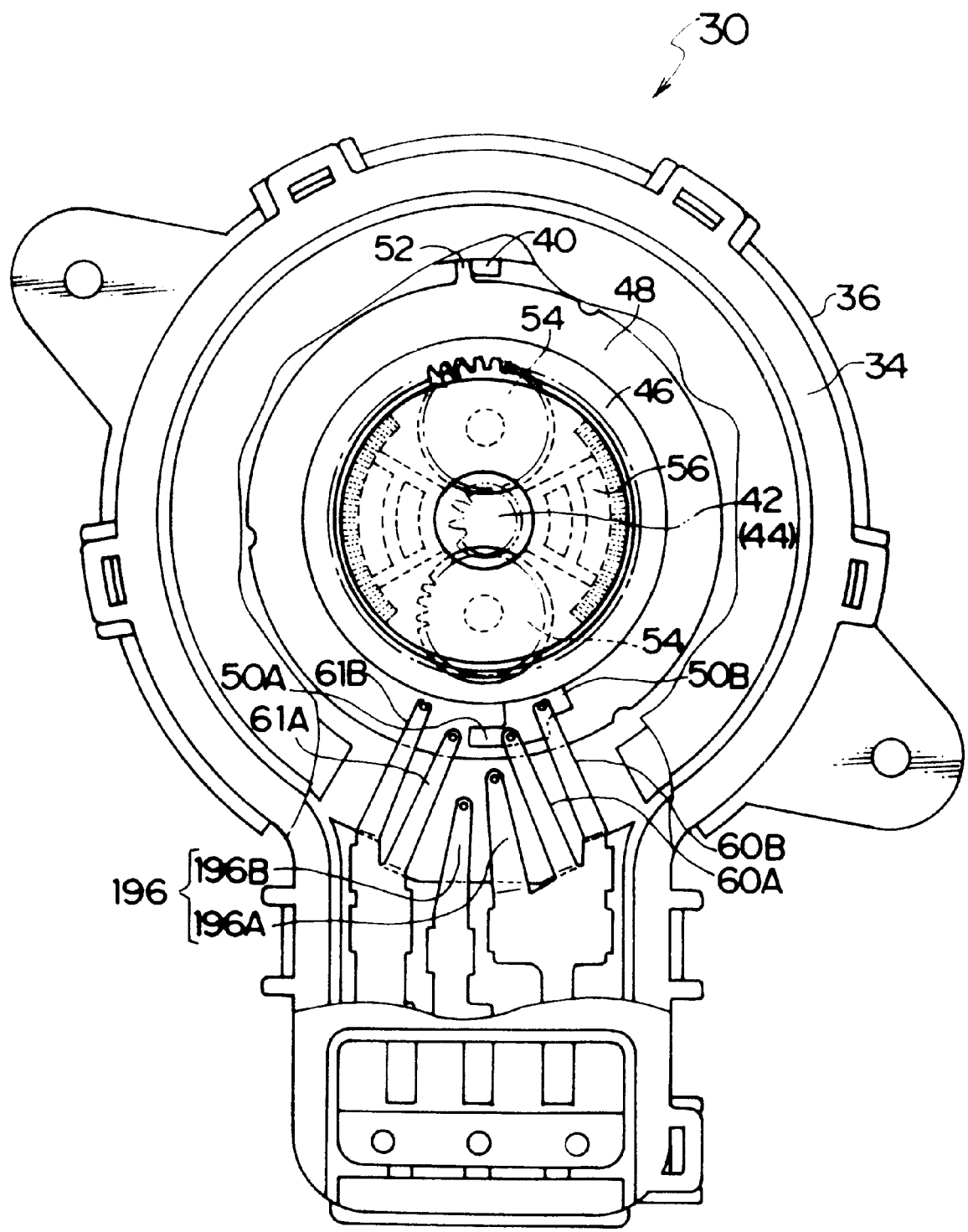
FIG. 5 is a partially broken plan view of the position detecting device relating to the embodiment of the present invention.
Figure 6:
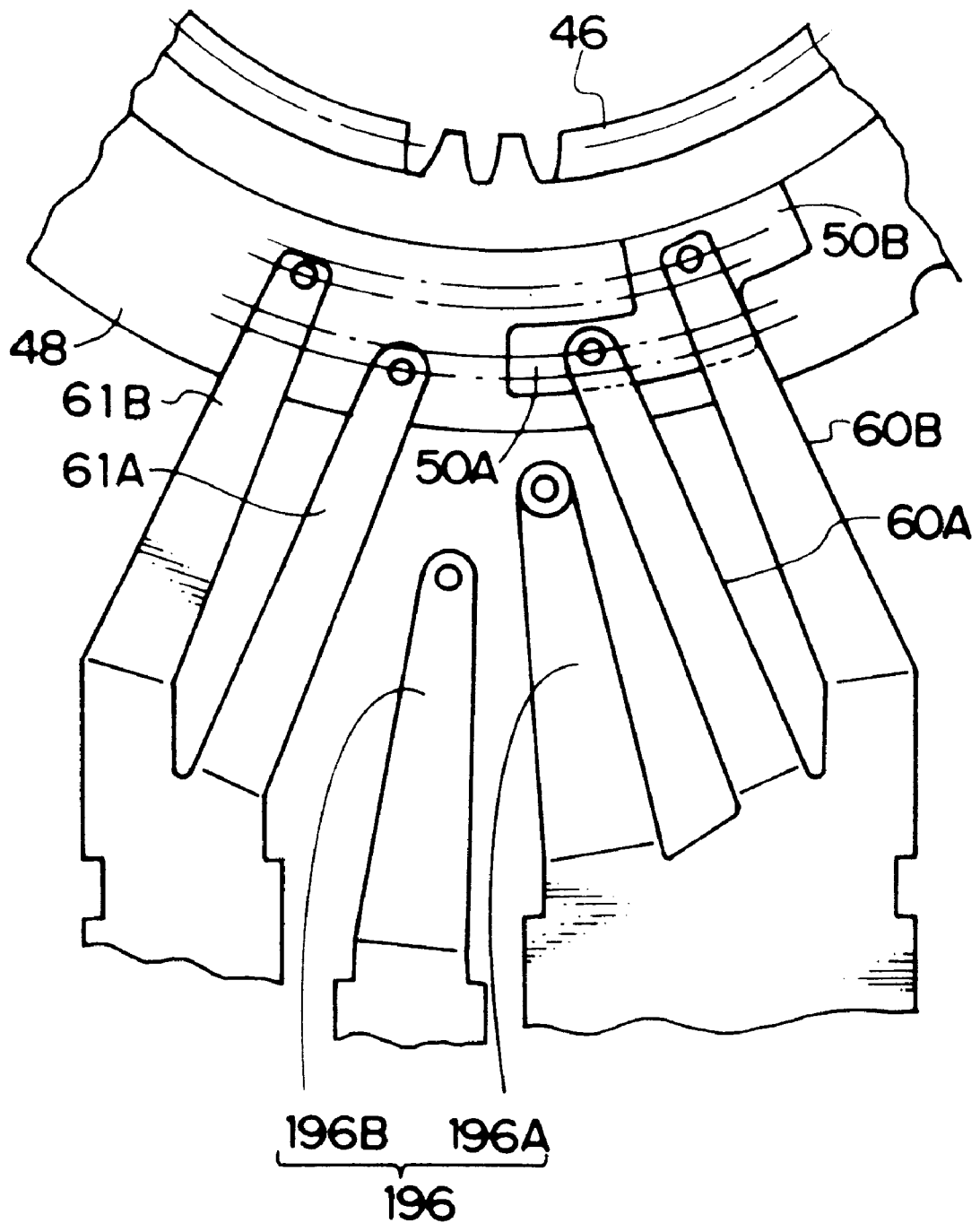
FIG. 6 is a plan view illustrating the corresponding relationship between the fixed contacts and moving contacts of the position detecting device relating to the embodiment of the present invention.
Figure 7:
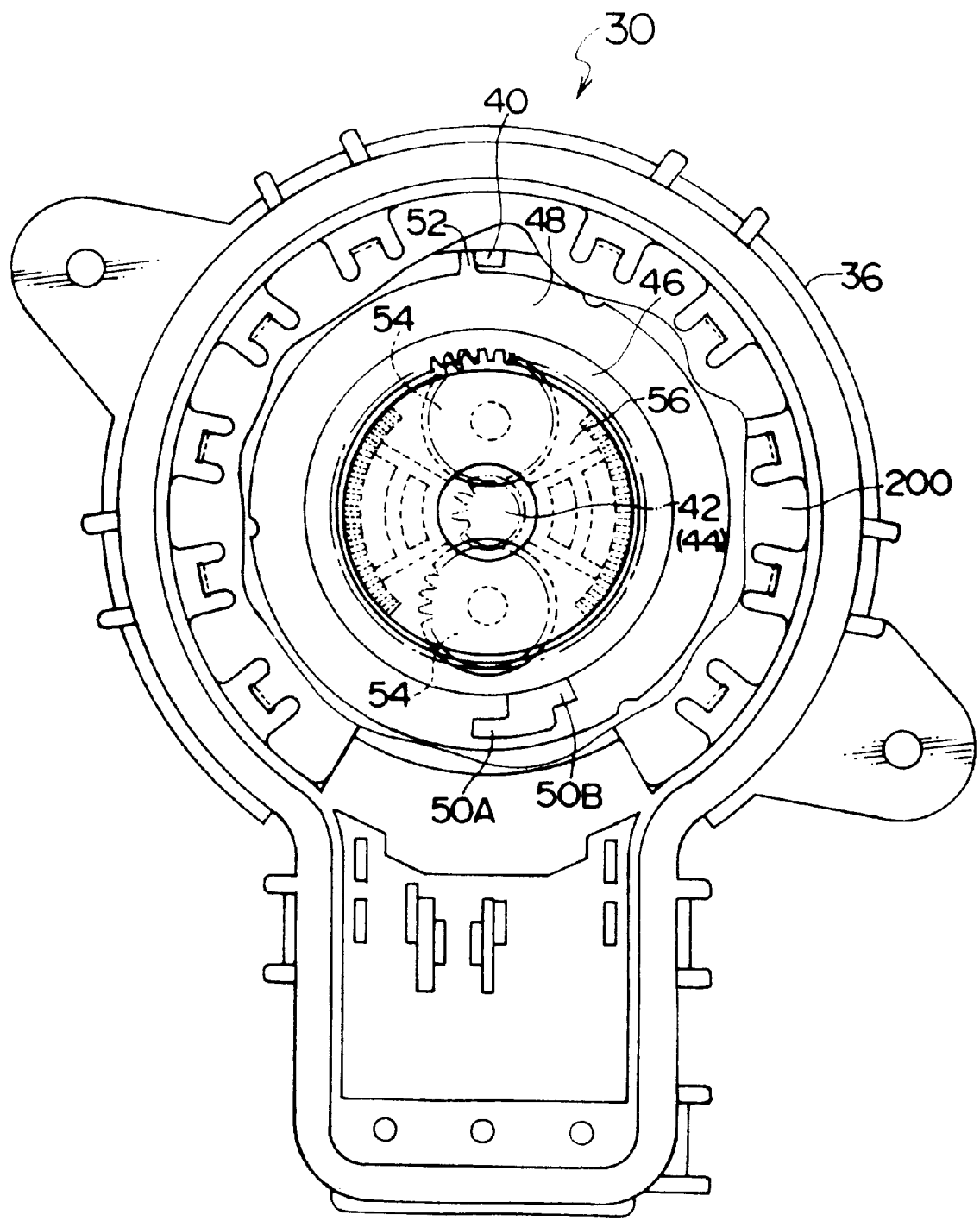
FIG. 7 is a partially broken plan view illustrating the position detecting device relating to the embodiment of the present invention.

A ring gear 46 forming a portion of the planetary gear group is disposed at the periphery of the connecting shaft 42 so as to oppose the sun gear 44. The ring gear 46 is accommodated in the cover plate 36 so as to be rotatable. As illustrated in detail in FIG. 8, a flange portion 48 is formed integrally at the periphery of the ring gear 46. The flange portion 48 is a conductive plate formed integrally with the ring gear 46. Moving contacts 50A, 50B are provided at a portion of the peripheral surface of the flange portion 48 at the side opposite the cover plate 36. The moving contacts 50A, 50B are a non-conductive portion formed in a two-step circular-arc shape, and are formed substantially coplanarly with the flange portion 48. A projecting portion 52 is formed at a portion of the periphery of the flange portion 48. The projecting portion 52 corresponds to the projection 40 formed at the cover plate 36. At the point in time when the ring gear 46 (the flange portion 48) is rotated in the forward direction (in the direction of arrow A in FIG. 1) and reaches a predetermined rotational position, the projecting portion 52 abuts the projection 40 (the state illustrated in FIGS. 5 and 7) such that further rotation of the ring gear 46 in the forward direction is prevented.

The two planetary gears 54 are disposed between the sun gear 44 and the inner peripheral portion of the ring gear 46. As shown in detail in FIG. 9, the planetary gears 54 are rotatably supported by a carrier 56, and mesh with the ring gear 46 and the sun gear 44. Namely, the sun gear 44, the ring gear 46 and the planetary gears 54 form a planetary gear group which can decelerate and transmit the rotation of the connecting shaft 42 (i.e., the shaft 20). For example, in a state in which the carrier 56 is held and revolution of the planetary gears 54 is prevented, rotation of the connecting shaft 42 (i.e., the shaft 20) can be decelerated and transmitted to the ring gear 46.

In the present embodiment, the speed reducing ratio of the planetary gear group formed by the sun gear 44, the ring gear 46 and the planetary gears 54 is 5.2:1. During one stroke of the window glass (i.e., during the time the sun gear 44 rotates 3 to 4.5 times), the ring gear 46 rotates less than one complete rotation at all of the window glasses.

The speed reducing ratio of the planetary gear group is not limited to 5.2:1, and can be set arbitrarily as desired.

A knurl groove 59 is formed in the inner peripheral surface of the cover plate 36 which covers the planetary gear group formed by the sun gear 44, the ring gear 46 and the planetary gears 54. The carrier 56 abuts the knurl groove 59.

A protective plate 200, which serves as a planetary gear group holding member, is disposed at the side of the planetary gear group opposite the side at which the cover plate 36 is disposed. The peripheral portion of the protective plate 200 is held by and fixed to the cover plate 36 so as to cover the planetary gear group. Further, as shown in FIG. 12B as well, spring claws 58 forming a clutch mechanism are formed integrally with the protective plate 200. The spring claws 58 extend toward the carrier 56 and always press the carrier 56 toward the toward the cover plate 36. In this way, the carrier 56 always abuts, in a press-contacting state, the knurl groove 59 formed in the cover plate 36 such that rotation of the carrier 56 is prevented, and the planetary gears 54 are maintained in a state in which revolution thereof is prevented. However, in the state in which the projecting portion 52 of the flange portion 48 of the ring gear 46 abuts the projection 40 and further forward direction rotation of the ring gear 46 is prevented, the forward direction rotational force of the sun gear 44, which exceeds the pressing force (holding force) of the carrier 56, is applied, and the spring claws 58 release the holding of the carrier 56 so that revolution of the planetary gears 54 becomes possible. More specifically, after the projecting portion 52 of the flange portion 48 has abutted the projection 40, the spring claws 58 can cut off the transmission of the forward direction rotational force from the sun gear 44 (the shaft 20) to the ring gear 46. Accordingly, in a state in which the projecting portion 52 abuts the projection 40 and rotation of the ring gear 46 is prevented, when the sun gear 44 (the shaft 20) rotates in the forward direction (in the direction of attempting to rotate the ring gear 46 in the forward direction), only the planetary gears 54 revolve.

Figure 4:
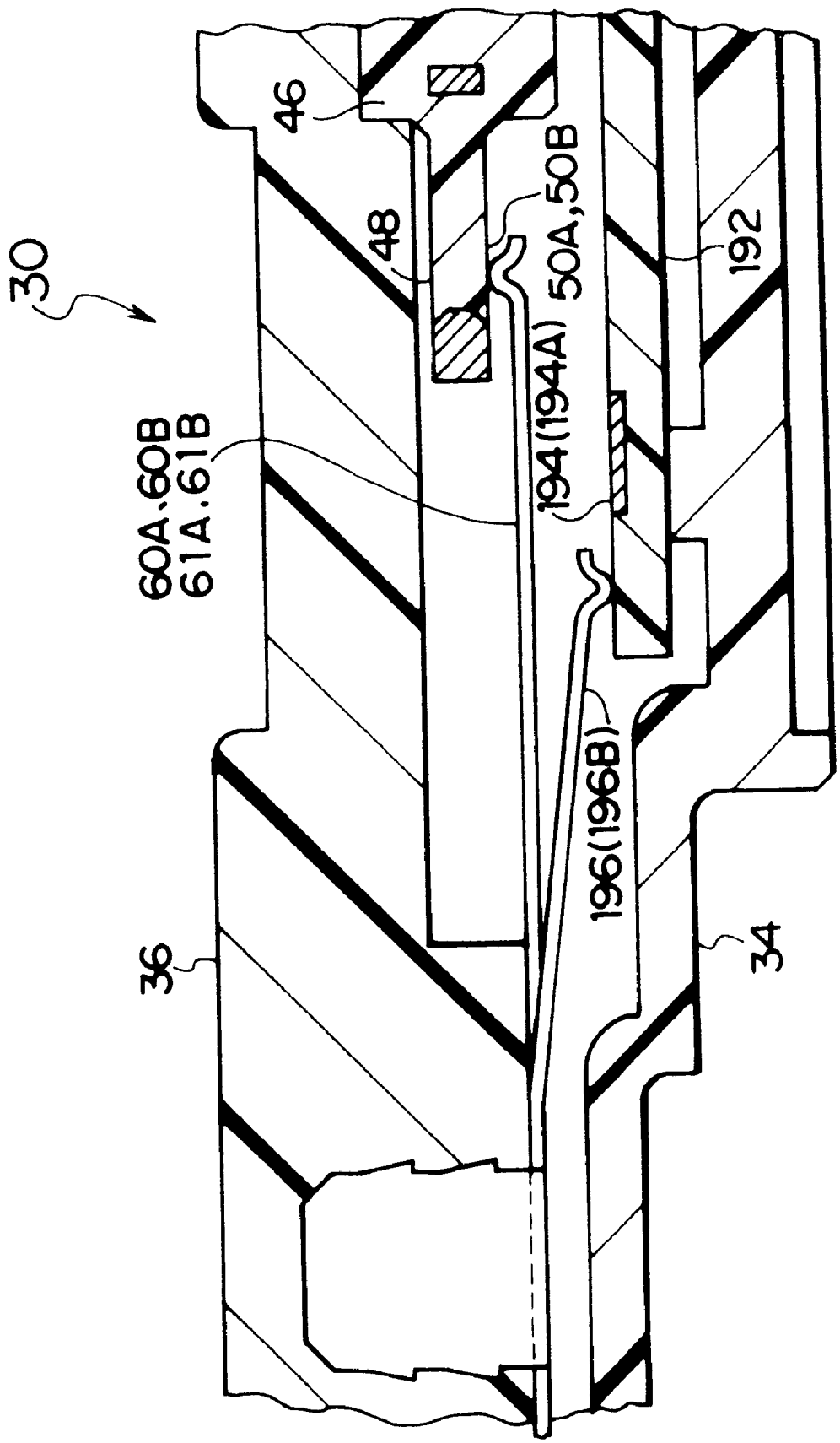
FIG. 4 is an enlarged sectional view illustrating the corresponding relationship between a ring gear and a fixed contact of the position detecting device relating to the embodiment of the present invention.
Figure 10A:
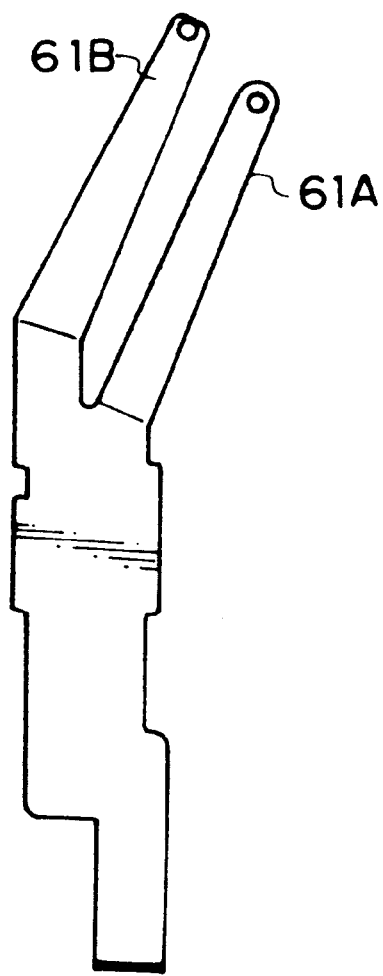
FIGS. 10A and 10B are plan views of the fixed contacts of the position detecting device relating to the embodiment of the present invention.
Figure 10B:
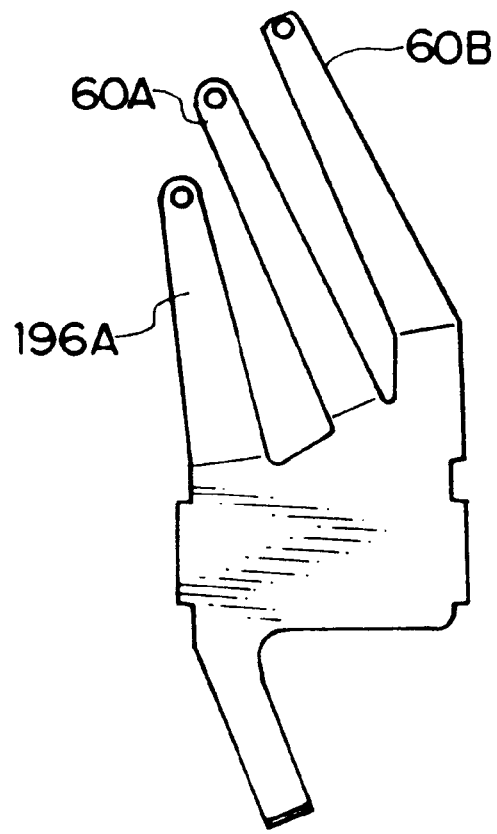

Fixed contacts 60A, 61A and fixed contacts 60B, 61B, which are two groups of pairs of fixed contacts, are mounted to the cover plate 36. The fixed contacts 60A, 61A and the fixed contacts 60B, 61B form a contact plate of two groups having elasticity. As illustrated in detail in FIG. 10, the fixed contact 60A and the fixed contact 60B are formed integrally, and the fixed contact 61A and the fixed contact 61B are formed integrally. Ones of ends of the fixed contacts 60A, 61A and fixed contacts 60B, 61B are fixed to the cover plate 36, whereas the respective distal ends thereof extend toward the flange portion 48 of the ring gear 46. The distal end portions elastically abut the flange portion 48 (the peripheral surface thereof at the side opposite the cover plate 36). More specifically, as illustrated in detail in FIG. 4, the fixed contacts 60A, 61A and the fixed contacts 60B, 61B press-contact the flange portion 48 (the moving contacts 50A, 50B) of the ring gear 46 from the side opposite the cover plate 36.

The fixed contacts 60A, 61A and the fixed contacts 60B, 61B contact the moving contacts 50A, 50B at predetermined rotational positions of the ring gear 46. The fixed contacts 60A, 61A correspond to the moving contact 50A, and the fixed contacts 60B, 61B correspond to the moving contact 50B.

The fixed contacts 60A, 61A and the fixed contacts 60B, 61B are electrically connected to the control circuit of the power window device. Due to the moving contacts 50A, 50B contacting both of the fixed contacts 60A, 60B such that there is a non-conductive state, the rotational position of the ring gear 46, i.e., the rotational position of the sun gear 44, i.e., the rotational position of the shaft 20, can be detected.

This detected rotational position is used in controlling the rotation of the motor 10, as will be described later.

In the present embodiment, the dimensions of the respective portions are set such that, for example, at the point in time when a window glass reaches a position which is 4 mm lower than the top end stop position, the projecting portion 52 reaches an upstream side position at a predetermined angle of rotation from the position at which the projecting portion 52 abuts the projection 40, and further, at this point in time, the moving contacts 50A, 50B contact the fixed contacts 60A, 60B such that there is a non-conductive state, and thereafter, the non-conductive state is maintained until the projecting portion 52 abuts the projection 40.

Further, the position of the moving body may be detected by the following structure which is a reverse case of the above-described structure: at the point in time when the window glass reaches a position 4 mm beneath the top edge stop position and the projecting portion 52 reaches a position upstream, by a predetermined angle of rotation, from the position at which the projecting portion 52 abuts the projection 40, the moving contacts 50A, 50B contact the fixed contacts 60A, 61A and the fixed contacts 60B, 61B, and are in a conductive state. Moreover, it is not absolutely necessary to, after the non-conductive state or conductive state has been attained, electrically maintain this non-conductive state or conductive state as in the above-described structure. It can be determined that the predetermined rotational position has been reached by detecting a trigger signal which is outputted by the moving contacts 50A, 50B contacting the fixed contacts 60A, 61A and the fixed contacts 60B, 61B.

The position detecting device 30 includes a pulse plate 192 serving as a pulse generating means and a sliding contact 196 serving as a pulse detecting means.

As illustrated in detail in FIG. 11, the pulse plate 192 is formed as a thin circular plate. The connecting shaft 42 is press-fit into and integrally fixed to a fitting hole 198 formed in the central portion of the pulse plate 192. Accordingly, the pulse plate 192 always rotates integrally with the connecting shaft 42. A conductive portion 194 is provided at the periphery of the pulse plate 192 along the peripheral direction of the pulse plate 192. The conductive portion 194 is formed by a ring-shaped first conductive portion 194A and second conductive portions 194B which are adjacent to the first conductive portion 194A and are a series of pulse-shaped convex and concave portions.

The base portion of the sliding contact 196 is fixed to the cover plate 36 and extends toward the conductive portion 194 of the pulse plate 192. The sliding contact 196 is formed by an input contact 196A, which always contacts the first conductive portion 194A of the conductive portion 194, and an output contact 196B, which contacts the second conductive portions 194B of the conductive portion 194. As the pulse plate 192 rotates, a pulse signal can be detected. The detected pulse signal is used in controlling the position of the moving body (the window glass).

The conductive portion 194 may be provided on the peripheral side wall of the pulse plate 192 rather than on the top surface thereof. In this case, the sliding contact 196 is fixed to the cover plate 36 so as to oppose the peripheral side wall of the pulse plate 192.

Figure 13:
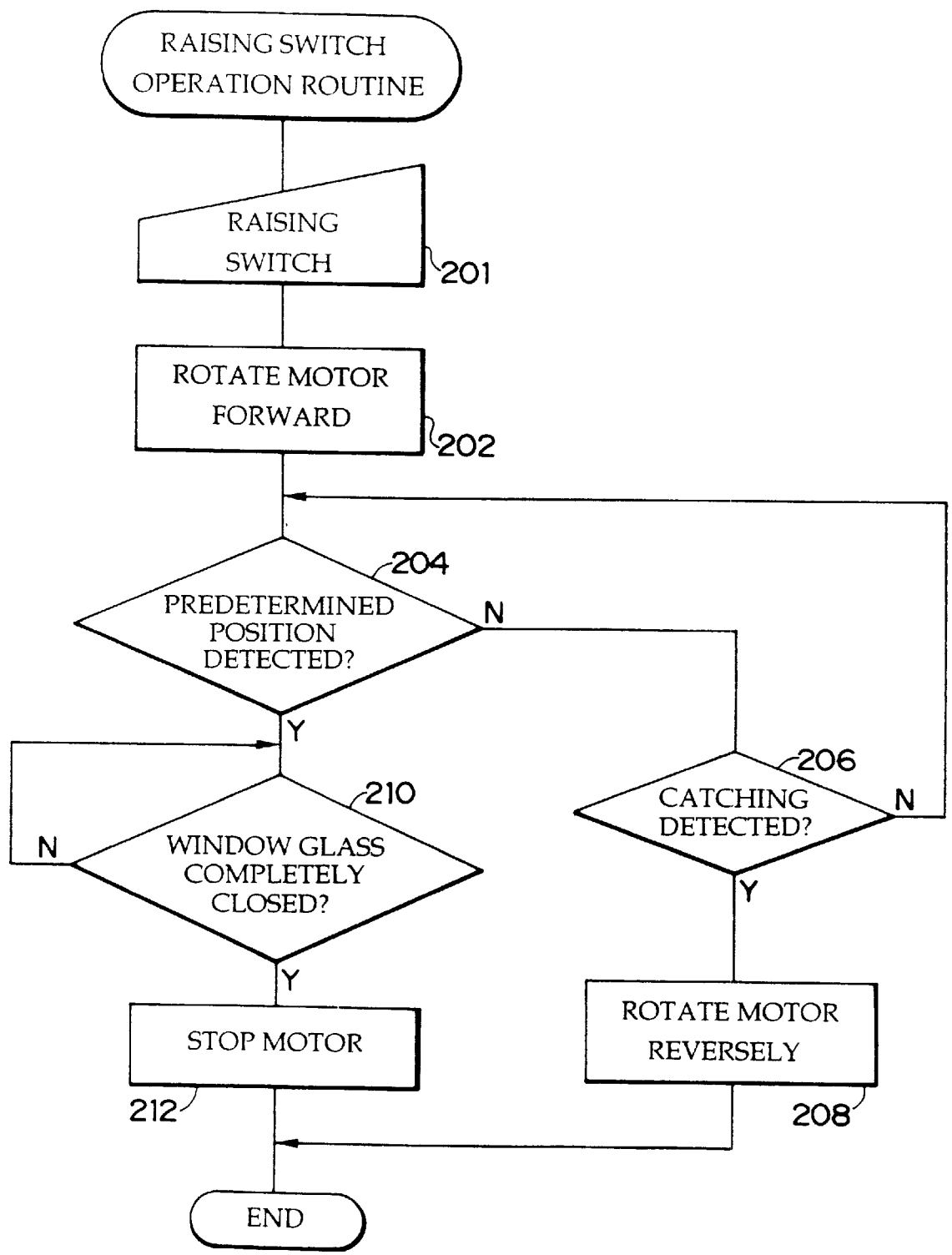
FIG. 13 is a flowchart illustrating control at the time that a raising switch of a power window device, to which the position detecting device relating to the embodiment of the present invention is applied, is operated and a window glass is raised.

Operation of the present embodiment will be described hereinafter with reference to the flowchart in FIG. 13 by an example of a case in which a raising switch of a power window device is operated and a window glass is raised.

At the above-described motor 10 and position detecting device 30, when the raising switch of the power window device is operated in step 201, in step 202, the motor 10 is operated and the shaft 20 rotates, thereby operating the window regulator so that the window glass is raised.

Usually (while the window glass is being raised), the carrier 56 is pressed and held by the spring claws 58, and revolution of the planetary gears 54 is prevented. Accordingly, as the shaft 20 rotates, the rotating force of the connecting shaft 42 (i.e., the sun gear 44) is decelerated and transmitted to the ring gear 46 via the planetary gears 54, and the ring gear 46 is gradually rotated in the forward direction.

Next, in step 204, the position detecting device 30 detects whether a predetermined rotational position of the motor 10 has been reached, i.e., whether the window glass has reached a predetermined position (a position 4 mm beneath the top edge stop position).

More specifically, at the position detecting device 30, as the shaft 20 rotates, the rotating force of the connecting shaft 42 (i.e., the sun gear 44) is decelerated and transmitted to the ring gear 46 via the planetary gears 54, and the ring gear 46 is gradually rotated in the forward direction. If the window glass has not reached the position 4 mm beneath the top edge stop position, the projecting portion 52 is far apart from the projection 40, and the moving contacts 50A, 50B are separated from the fixed contacts 60A, 61A and the fixed contacts 60B, 61B and are in a non-conductive state. The rotational position of the shaft 20 is thereby detected (i.e., it is detected that the window glass has not reached the position 4 mm beneath the top edge stop position). In this case, the operating of the motor 10 is continued and the routine proceeds to step 206 where it is determined whether a foreign object has been caught on the basis of a change in the pulse signal generated by the conductive portion 194 and the sliding contact 196 which accompanies the rotation of the pulse plate 192. When the catching of a foreign object is detected, in step 208, the motor 10 is rotated in the reverse direction, and the window glass is lowered. In step 206, if catching of a foreign object is not detected, the routine returns to step 204.

In step 204, when the window glass reaches a position 4 mm beneath the top edge stop position, the projecting portion 52 reaches a position which is upstream, by a predetermined angle of rotation, from the position at which the projecting portion 52 abuts the projection 40. At this point in time, the moving contacts 50A, 50B contact the fixed contacts 60A, 60B and are in a non-conductive state. In this way, the rotational position of the shaft 20 is detected (i.e., it is detected that the window glass has reached a position 4 mm beneath the top edge stop position).

When it is detected in step 204 that the shaft 20 of the motor 10 has reached a predetermined rotational position, i.e., that the window glass has reached a predetermined position, the routine proceeds to step 210 while operating of the motor 10 is continued. At this time, the relative contact positions of the moving contacts 50A, 50B and the fixed contacts 60A, 60B, 61A, 61B are changing, but the non-conductive state is maintained.

In step 210, it is judged whether the window glass is completely closed, on the basis of the pulse signal which accompanies rotation of the pulse plate 192 or on the basis of the lock current of the motor 10 or the like. When the window glass is completely closed, the motor 10 is stopped in step 212, and the process ends.

In this way, in the position detecting device 30, the rotational position of the shaft 20, i.e., the position of the window glass (i.e., whether the window glass has reached a position 4 mm lower than the top edge stop position), can accurately be detected by the moving contacts 50A, 50B, which rotate together with the ring gear 46, and the two groups of fixed contact pairs which are the fixed contacts 60A, 61A and the fixed contacts 60B, 61B.

Further, in the position detecting device 30, at the time of assembly into the vehicle body, by rotating the shaft 20 of the motor 10 sufficiently in the forward direction, an initial state in which the moving contacts 50A, 50B contact the fixed contacts 60A, 60B can be set automatically.

More specifically, at the time of assembly into the vehicle body, when the shaft 20 of the motor 10 is rotated sufficiently in the forward direction, first, the projecting portion 52 of the flange portion 48 of the ring gear 46 abuts the projection 40, and further rotation of the ring gear 46 in the forward direction is prevented. In this state, if the shaft 20 is rotated even further, rotational force of the sun gear 44, which exceeds the pressing force (holding force) of the carrier 56, is applied such that the spring claws 58 release the holding of the carrier 56, and revolution of the planetary gears 54 is permitted. More specifically, after the projecting portion 52 of the flange portion 48 abuts the projection 40, the spring claws 58 can cut off the transmission of forward direction rotational force from the sun gear 44 (the shaft 20) to the ring gear 46. Therefore, in the state in which the projecting portion 52 abuts the projection 40 and rotation of the ring gear 46 is prevented, when the sun gear 44 (the shaft 20) rotates in the forward direction (the direction of rotating the ring gear 46 in the forward direction), only the planetary gears 54 revolve. Accordingly, after the projecting portion 52 abuts the projection 40 and the moving contacts 50A, 50B contact the fixed contacts 60A, 60B, even if the shaft 20 of the motor 10 rotates in the forward direction, the ring gear 46 does not move, and the contacting state of the moving contacts 50A, 50B and the fixed contacts 60A, 60B is maintained. Namely, by rotating the shaft 20 of the motor 10 sufficiently in the forward direction, the initial state, in which the projecting portion 52 abuts the projection 40 and the moving contacts 50A, 50B contact the fixed contacts 60A, 60B, is automatically set.

In the position detecting device 30, the position separated by a predetermined distance (4 mm in the present embodiment) from the completely closed position of the window glass (the upper limit of movement of the window glass) can be mechanically stored (i.e., detection is carried out on the basis of the position 4 mm beneath the top edge stop position), regardless of whether the window glass has reached the completely closed position (the upper limit of movement). Therefore, control of the movement of the window glass can be reliably effected without error. For example, conventionally, in a structure in which the rotational frequency of the armature of the motor is detected and the position of the window glass is detected, resetting is carried out on the basis of the completely closed position of the window glass. However, if the window glass was stopped when it had not yet reached the actual upper limit of movement due to a drop in the power source voltage or an increase in the frictional resistance between the window glass and the window frame or for some other reason, resetting would be carried out with this unauthentic stop position as the completely closed position of the window glass. Accordingly, in this case, because control of the driving of the motor would be carried out on the basis of this unauthentic window glass completely closed position, the error would be quite great. In contrast, in the position detecting device 30 of the present invention, even in a case in which the window glass is stopped without reaching the actual completely closed position (the upper limit of the range of movement), thereafter, the window glass passing the position 4 mm from the actual completely closed position is accurately detected at the time the window glass passes this position. Accordingly, control of the movement of the window glass can be carried out reliably and without error. In particular, in a wire-type window regulator device, the error in position control due to the slack of the wire is great. However, the error caused by the slack in the wire can be compensated for by using the position detecting device 30, and highly accurate control is possible.

In this way, in the position detecting device 30, by rotating the shaft 20 of the motor 10 sufficiently in the forward direction at the time of assembly into the vehicle body, the initial state, in which the projecting portion 52 abuts the projection 40 and the moving contacts 50A, 50B contact the fixed contacts 60A, 60B, is set automatically. The initial positions can be set easily without complicated adjustment of the installation positions at the time of assembly or complicated resetting after assembly. Further, control of the movement of the window glass can be carried out reliably and without error.

Further, in the position detecting device 30 relating to the present embodiment, a pulse signal is detected by the output contact 196B repeatedly contacting and not contacting the second conductive portions 194B of the conductive portion 194 as the pulse plate 192 rotates. Accordingly, the rotational speed of the shaft 20 of the motor 10 can be detected linearly on the basis of this detected pulse signal.

Therefore, for example, in a case in which the position detecting device 30 is used in a vehicle power window device having a catch-preventing function, a predetermined position and the moving speed of the window glass can be linearly detected and controlled at all times.

Moreover, in the position detecting device 30, the spring claws 58 which press the clutch mechanism, i.e., the carrier 56, are formed integrally with the protective plate 200, and are disposed at the side of the planetary gear group (the planetary gears 54 and the carrier 56) which is opposite the side at which the cover plate 36 is provided. Therefore, the assemblability of the parts improves.

More specifically, the assembly of parts of the position detecting device 30 is carried out with the cover plate 36 being used as a reference. First, the ring gear 46 is provisionally installed at the inner peripheral surface of the cover plate 36. The planetary sub-assembly formed by the planetary gears 54 and the carrier 56 is inserted into the ring gear 46 such that the planetary gears 54 mesh with the ring gear 46. In this state, the protective plate 200 is press-fit into and fixed to the cover plate 36. Then, the fixed contacts 60A, 61A, the fixed contacts 60B, 61B and the sliding contact 196 are press-fit into and fixed to the cover plate 36.

The sun gear 44 (the shaft 20), which is fixed integrally to the pulse plate 192, is inserted and meshes with the planetary gears 54. In this state, the base plate 34 is fit with the cover plate 36, and the assembly of the parts is thereby completed.

In this way, in the position detecting device 30, when the planetary gear group (the planetary gears 54 and the carrier 56) is provisionally installed by using the cover plate 36 as a reference, it is possible to install the protective plate 200 (the spring claws 58) after the planetary gear group (the planetary gears 54 and the carrier 56) is installed. As a result, in the state in which the planetary gear group (the planetary gears 54 and the carrier 56) is provisionally installed, clutch force (pressing/urging force) of the spring claws 58 is not applied to the planetary gear group (the carrier 56).

Accordingly, the planetary gear group (the planetary gears 54 and the carrier 56) does not rise up from the cover plate 36 while in the provisionally installed state, and the axis does not shift. Moreover, in the state in which the planetary gear group (the planetary gears 54 and the carrier 56) and the protective plate 200 (the spring claws 58) are provisionally installed, clutch force (pressing/urging force) of the spring claws 58 acts on the carrier 56. This clutch force (pressing/urging force) of the spring claws 58 acts in a direction of pressing the carrier 56 toward the cover plate 36. Accordingly, in this state as well, the planetary gear group (the planetary gears 54 and the carrier 56) is reliably held by the clutch force (urging/pressing force) of the spring claws 58. The planetary gear group does not rise up from the cover plate 36, and the axis does not shift. In this way, accurate positioning at the time of installing the planetary gear group (the planetary gears 54 and the carrier 56) is not prevented, and the assemblability is greatly improved.

Further, in the position detecting device 30 relating to the present embodiment, as described above, because the spring claws 58 which press the clutch mechanism, i.e., the carrier 56, are formed integrally with the protective plate 200, the number of parts can be reduced, which is advantageous.

Figure 14:
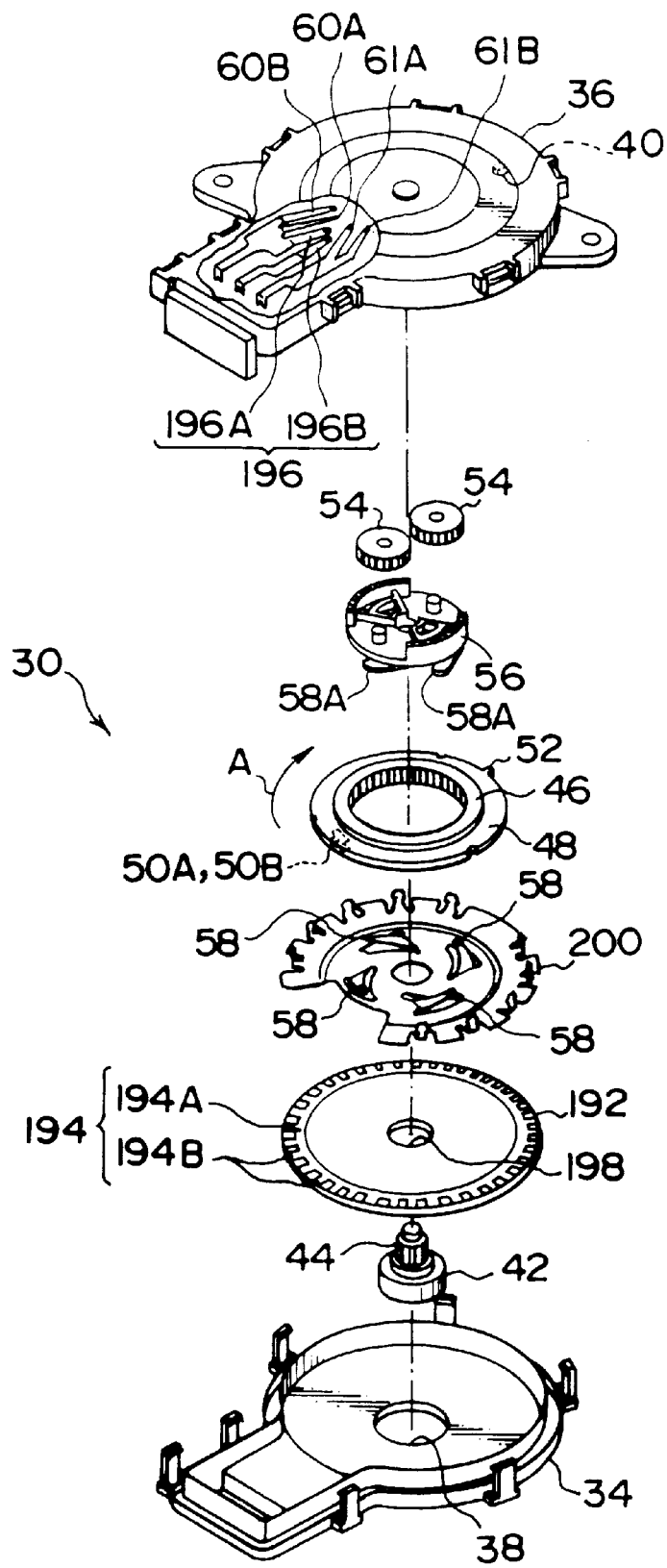
FIG. 14 is an exploded perspective view of a position detecting device relating to another embodiment of the present invention.
Figure 15:
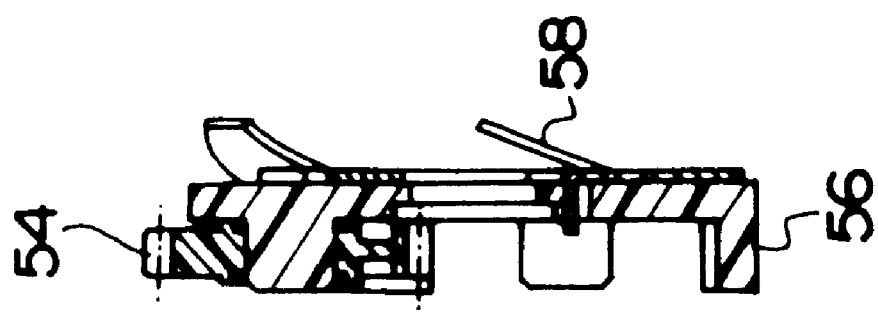
FIG. 15 is a view, corresponding to FIG. 9B, illustrating a carrier relating to the other embodiment of the present invention.

In the above-described embodiment, the spring claws 58 serving as the clutch mechanism are formed integrally with the protective plate 200. However, as illustrated in FIGS. 14 and 15, it suffices to provide claw portions 58A, which form the clutch mechanism, at the carrier 56 and for the protective plate 200 to not have the spring claws 58 as illustrated in FIGS. 16A and 16B. FIG. 14 is an exploded perspective view corresponding to FIG. 1. FIG. 15 is a sectional view corresponding to FIG. 9B and illustrating the carrier 56. FIGS. 16A and 16B are respectively a plan view and a sectional view of the protective plate 200, and correspond to FIGS. 12A and 12B respectively.

In this case as well, the carrier 56 is pressed to abut the knurl groove 59 formed in the cover plate 36, and the same effects as those of the previously-described embodiment are achieved.

In the above-described embodiments, an example is described in which the position detecting device 30 is applied directly to a motor 10 of a power window device. However, the position detecting device 30 is not limited to being applied directly to such a motor 10, and can be applied to other mechanisms and other regions as well. For example, the position detecting device 30 may be provided at the arm rotating/supporting shaft of an X-arm-type window regulator device, or may be provided at a pulley for taking up a wire in a wire-type window regulator device. In these cases as well, not only can the window glass position be detected with high precision and highly accurate movement control be made possible, but also, the initial positions can be set easily without complicated adjustment of the installation positions at the time of assembly or complicated resetting after assembly.

In the above-described embodiments, the position detecting device 30 detects and controls the rotational position of the output shaft (the shaft 20) of the motor 10 for a power window device. However, the present invention is not limited to the same, and is also applicable to a case in which a position of a moving body which moves reciprocally (e.g., a sunroof which moves on guide rails or the like) is directly detected and controlled.

The present invention described above has superior effects in that the position of a moving body such as a window glass or a sunroof or the like can be detected with high accuracy, initial positions can be set without complicated adjustment, these features can be realized by a simple structure and at a low cost, and assemblability can be greatly improved.

While the embodiments of the present invention as disclosed herein constitute a preferred form, it is to be understood that other forms might be adopted.

What is claimed is:

1. A device for detecting a position of a moving body movable in forward and reverse directions, comprising:

a planetary gear group including a ring gear rotatably held in a cover plate of the device and a planetary gear rotatably supported in a carrier and operably connected with the ring gear, said planetary gear group being operable with the moving body through a moving force transmitted from the moving body when the moving body moves in forward and reverse directions;

a switch portion including a moving contact formed integrally with the ring gear for rotating with the ring gear, and a fixed contact provided in the cover plate and formed to contact the moving contact, said switch portion for detecting a predetermined position of the moving body by on-and-off operation of said switch portion;

a clutch mechanism operably connected to the carrier for preventing revolution of the planetary gear to transmit the moving force of the moving body from the planetary gear to the ring gear to thereby rotate the ring gear, and cutting off transmission of the moving force in the forward direction from the moving body to the ring gear by permitting revolution of the planetary gear when said switch portion is actuated, and said clutch mechanism including urging means for pressing the carrier, wherein said urging means is disposed on one side of said planetary gear group, and the cover plate is disposed on the opposite side thereof.

2. A device for detecting a position of a moving body according to claim 1, further comprising:

a protective plate provided on a side of said planetary gear group opposite the cover plate, wherein said urging means is disposed between the carrier and said protective plate.

3. A device for detecting a position of a moving body according to claim 2, wherein said urging means is formed integrally with said protective plate.

4. A device for detecting a position of a moving body according to claim 2, wherein said protective plate comprises a generally elastic plate, and said urging means comprises spring claws formed by cut portions of said metal protective plate, the cut portions being bent toward the cut portions toward the cover plate.

5. A device for detecting a position of a moving body according to claim 3, wherein said protective plate comprises a generally elastic plate, and said urging means comprises spring claws formed by cut portions of said metal protective plate, the cut portions being bent toward the cover plate.

6. A device for detecting a position of a moving body according to claim 2, wherein said urging means is provided integrally with the carrier.

7. A device for detecting a position of a moving body according to claim 1, wherein a knurl groove formed in the cover plate abuts the carrier, and the carrier is pressed by said urging means.

8. A device for detecting a position of a moving body according to claim 1, further comprising:

pulse generating means provided within the cover plate such that a protective plate is interposed between said pulse generating means and said planetary gear group, said pulse generating means being interlocked with the moving body to generate pulses; and pulse detecting means for detecting the pulses generated by said pulse generating means.

9. A device for detecting a position of a moving body movable in forward and reverse directions, comprising:

a planetary gear group including a ring gear rotatably held in a cover plate of the device and a planetary gear rotatably supported in a carrier and operably connected with the ring gear, said planetary gear group being operable with the moving body through a moving force transmitted from the moving body when the moving body moves in forward and reverse directions;

a switch portion including a moving contact formed integrally with the ring gear for rotating with the ring gear, and a fixed contact provided in the cover plate and formed to contact the moving contact, said switch portion for detecting a predetermined position of the moving body by on-and-off operation of said switch portion;

a clutch mechanism operably connected to the carrier for preventing revolution of the planetary gear to transmit the moving force of the moving body from the planetary gear to the ring gear to thereby rotate the ring gear, and cutting off transmission of the moving force in the forward direction from the moving body to the ring gear by permitting revolution of the planetary gear when said switch portion is actuated;

a protective plate provided on a side of said planetary gear group opposite the cover plate;

said clutch mechanism including urging means for pressing the carrier;

said urging means is disposed on one side of said planetary gear group opposite the cover plate said cover plate including a knurl groove;

said knurl groove abutting the carrier, the carrier being pressed by said urging means; and said urging means being disposed between the carrier and said protective plate.

10. A device for detecting a position of a moving body according to claim 9, wherein said urging means is formed integrally with said protective plate.

11. A device for detecting a position of a moving body according to claim 9, wherein said protective plate comprises a generally elastic plate, and said urging means comprises spring claws formed by cut portions of said metal protective plate, the cut portions being bent toward the cover plate.

12. A device for detecting a position of a moving body according to claim 10, wherein said protective plate comprises a generally elastic plate, and said urging means comprises spring claws formed by cut portions of said metal protective plate, the cut portions being bent toward the cover plate.

13. A device for detecting a position of a moving body according to claim 9, wherein said urging means is provided integrally with the carrier.

14. A device for detecting a position of a moving body according to claim 9, further comprising:

pulse generating means provided within the cover plate such that said protective plate is interposed between said pulse generating means and said planetary gear group, said pulse generating means being interlocked with the moving body to generate pulses; and pulse detecting means for detecting the pulses generated by said pulse generating means.

15. A device for detecting a position of a moving body movable in forward and reverse directions, comprising:

a planetary gear group including a ring gear rotatably held in a cover plate of the device and a planetary gear rotatably supported in a carrier and operably connected with the ring gear, said planetary gear group being operable with the moving body through a moving force transmitted from the moving body when the moving body moves in forward and reverse directions;

a switch portion including a moving contact formed integrally with the ring gear for rotating with the ring gear, and a fixed contact provided in the cover plate and formed to contact the moving contact, said switch portion for detecting a predetermined position of the moving body by on-and-off operation of said switch portion;

a clutch mechanism operably connected to the carrier for preventing revolution of the planetary gear to transmit the moving force of the moving body from the planetary gear to the ring gear to thereby rotate the ring gear, and cutting off transmission of the moving force in the forward direction from the moving body to the ring gear by permitting revolution of the planetary gear when said switch portion is actuated;

a protective plate provided on a side of said planetary gear group opposite the cover plate;

said clutch mechanism including urging means for pressing the carrier;

said urging means is disposed on one side of said planetary gear group opposite the cover plate;

said cover plate including a knurl groove;

said knurl groove abutting the carrier, the carrier being pressed by said urging means; and said urging means being formed integrally with said protective plate.

16. A device for detecting a position of a moving body according to claim 15, wherein said protective plate comprises a generally elastic plate, and said urging means comprises spring claws formed by cut portions of said metal protective plate, the cut portions being bent toward the cover plate.

17. A device for detecting a position of a moving body according to claim 15, wherein said urging means is provided integrally with the carrier.

18. A device for detecting a position of a moving body according to claim 15, further comprising:

pulse generating means provided within the cover plate such that said protective plate is interposed between said pulse generating means and said planetary gear group, said pulse generating means being interlocked with the moving body to generate pulses; and pulse detecting means for detecting the pulses generated by said pulse generating means.

19. A device for detecting a position of a moving body movable in forward in reverse directions, comprising:

a planetary gear group including a ring gear rotatably held in a cover plate of the device and a planetary gear rotatably supported in a carrier and operably connected with the ring gear, said planetary gear group being operable with the moving body through a moving force transmitted from the moving body when the moving body moves in forward and reverse directions;

a switch portion including a moving contact formed integrally with the ring gear for rotating with the ring gear, and a fixed contact provided in the cover plate and formed to contact the moving contact, said switch portion for detecting a predetermined position of the moving body by on-and-off operation of said switch portion;

a clutch mechanism operably connected to the carrier for preventing revolution of the planetary gear to transmit the moving force of the moving body from the planetary gear to the ring gear to thereby rotate the ring gear, and cutting off transmission of the moving force in the forward direction from the moving body to the ring gear by permitting revolution of the planetary gear when said switch portion is actuated;

a protective plate provided on a side of said planetary gear group opposite the cover plate;

said clutch mechanism including urging means for pressing the carrier;

said urging means being disposed on one side of said planetary gear group opposite the cover plate said cover plate including a knurl groove;

said knurl groove abutting the carrier, the carrier being pressed by said urging means; and said urging means is formed integrally with the carrier.

20. A device for detecting a position of a moving body according to claim 19, further comprising:

pulse generating means provided within the cover plate such that said protective plate is interposed between said pulse generating means and said planetary gear group, said pulse generating means being interlocked with the moving body to generate pulses; and pulse detecting means for detecting the pulses generated by said pulse generating means.

21. A device for detecting a position of a moving body movable in forward and reverse directions, comprising:

a motor including a rotating shaft;

a switch portion for detecting a predetermined position of the moving body by on-and-off operation of said switch portion;

a rotatable gear wheel disposed within a housing of said motor and operably connected to said rotating shaft for decelerating rotation of said rotating shaft;

a cover plate in said housing;

a ring gear rotatably held in said cover plate for rotating interlockingly with said rotatable gear wheel, said ring gear for operating said switch portion;

a clutch mechanism for transmitting a rotating force of said rotatable gear wheel to said ring gear; and said clutch mechanism including urging means disposed on said rotatable gear wheel, said urging means generating a pressing force.

22. A device for detecting a position of a moving body according to claim 21, wherein said urging means comprises spring claws for generating a pressing force along an axial direction of said rotating shaft.

23. A device for detecting a position of a moving body according to claim 21, wherein said urging means is disposed between said cover plate and said clutch mechanism.

* * * * *

UNITED STATES PATENT AND TRADEMARK OFFICE
CERTIFICATE OF CORRECTION

PATENT NO. : 5,907,139
DATED : May 25, 1999
INVENTOR(S) : Yasuhiro FUKATSU et al.

It is certified that error appears in the above-indentified patent and that said Letters Patent is hereby corrected as shown below:

Title page, item [56] References Cited, insert the following:

Under U.S. Patent Documents insert:

--4,530,185    7/1985    Moriya et al.--;

Under Foreign Patent Documents insert:

--684,452     11/1995   Europe
  2,157,387   10/1985   United Kingdom--.

Signed and Sealed this

Twenty-ninth Day of August, 2000

Attest:

Q. TODD DICKINSON

Attesting Officer          Director of Patents and Trademarks